United States Patent Office 2,980,588
Patented Apr. 18, 1961

2,980,588
MULTIVITAMIN PREPARATION AND METHOD OF MAKING SAME

Raymond Larde, Paris, France, assignor to Les Laboratoires Français de Chimiothérapie, Paris, France, a corporation of France No Drawing. Filed July 18, 1957, Ser. No. 672,555

Claims priority, application France July 27, 1956

13 Claims. (Cl. 167—81)

This invention refers to a multivitamin preparation and method of making same. More particularly, the present invention relates to a method making it possible to produce a hydrodispersible multivitamin prepartion comprising at the same time fat-soluble and water-soluble vitamins.

The present invention contemplates the inclusion, if required, of still other medicinal substances, the simultaneous administration of which with the vitamins may be desirable, such as amino acids, pure ferment, peptides, mineral or organic derivatives of metals, and other adjuvants for beneficial effect on the body.

Vitamin preparations containing fat-soluble factors must have three main qualities: they must remain stable, i.e., over a period of time; be easily assimilated by the organism; and not have a disagreeable flavor.

There is, in general, only partial assimilation when the fat-soluble vitamins are administered in an oily solution. In fact, the small quantity of oil ingested may not be perfectly assimilated by the intestine, and in this case a considerable part of the vitamins is eliminated with the feces. In spite of their good stability, the use of oily solutions, which, moreover, do not allow incorporation of water-soluble vitamins or other medicines, is increasingly becoming obsolete. It has been tried to replace them by emulsions in water which allow a simultaneous association of water-soluble vitamins or other products, but such emulsions have generally only moderate stability and very variable organoleptic properties and also necessitate needless transportation of considerable quantities of water, which increases the cost of these products which may be a food supplement as well as a medicine. Still commercially sold are vitamin solutions in non-ionic surface-active substances, such as the polysorbates or other condensation derivatives of ethylene oxide on molecules derived from sugar or a fatty acid, but their flavor is very unpleasant and persists when they are dispersed in water at the time of use. If water and principles designed to improve their flavor are added, the stability of the preparation leaves much to be desired. Finally, vitamins previously dispersed to the highest degree can be incorporated in solid supports or vehicles, such as: gelatin, cellulose derivatives, pectins, starchy matters, which vehicles are used in the form of fine or coarse powders. These products, which keep extremely well and are generally used for feeding livestock, have the disadvantages, as regards their pharmaceutical use, that they do not permit the preparation of tablets and must in most cases be made up in gelatin capsules. They cannot, therefore, be used readily in pediatrics, and cannot be used as flexibly or widely as concentrated liquid preparations which make it possible to disperse the vitamins in water prior to use, or to mix them with milk, fruit juice, etc.

In view of the above, the present invention relates to a process of manufacturing a water-dispersible oily solution containing fat-soluble and water-soluble vitamins which permits the formation, by dilution in water at the time of use, of a milky liquid consisting of an extremely fine dispersion of the fat-soluble principles and containing, in solution, the water-soluble ingredients. The diluted preparation has a pleasant flavor and excellent stability and assimilation properties and permits at the same time the use of vitamins sensitive to air whether fat-soluble or not.

According to the process of the invention, it has been found that a preparation fulfilling the requirements of stability, dispersion, good assimilation and pleasant flavor can be produced by dissolving the fat soluble vitamins in a liquid produced by partial alcoholysis of the glycerides of a stone or kernel oil from Rosaceae kernels with polyethylene glycol according to the method of the Belgian Patent No. 555,400 to E. Mahler and M. Gattefossé. Such a product, which is commercially sold under the trade name of Labrafil 1944 C of the Establissements Gattefossé is made of an oil of peach stones, apricot stones, etc. According to the indications of the manufacturer, Labrafil 1944 C consists of an ethylene oxide condensate over Codex stone or pit oil having the following characteristics:

Color: light yellow.
Odor: that of stone oil.
Density 20° C.=0.94.
$n_D^{20}=1,4705$.
Viscosity at 20° C.=11.5° Engler.
Point of cloudiness or turbidity: becomes cloudy at —18° C., becomes clear again at —6° C.
Saponification index: 160–165.
Hydroxyl index: 60.
Iodine index: 88/89.

The water soluble vitamins or other produces insoluble in lipids are then dissolved, cold, in a vegetable oil jellied or gelled while hot by colloidal silica (2 to 7%). The colloidal silica used is preferably Aerosil, the characterizing properties of which are: average diameter of particles, 4 millimicrons; density not compressed or piled up, 0.04; compressed, 0.06. This result is entirely unexpected, for if the usual jellifying or gelling agents, aluminum or magnesium stearates or octoates are used instead of silica, the products obtained do not possess the desired organoleptic qualities; they have notably an unpleasant soap flavor whereas silica does not impart any particular taste to the mixture. An aroma, for instance, orange oil, is added to this gel which comprises, in suspension, the water soluble vitamins and other products not soluble in oil, and mixes this preparation with the solution of fat-soluble vitamins; the preparation thus made makes suspension very easy.

Instead of proceeding as described above, it is also possible to introduce first the water-soluble vitamins into the Labrafil, to jellify or gel a vegetable oil by incorporating colloidal silica, while hot, into this oil and then, after cooling, to add to this gel the fat-soluble vitamins and the desired essential oil and to mix the gel thus produced with the suspension or solution of water-soluble vitamins in Labrafil. On the other hand, it is not advisable to carry out gelation of the oil in the presence of vitamins as these may be changed by the heat.

The examples which follow serve to illustrate the invention without however limiting its scope. It is, notably, possible to use instead of the various silicas indicated other colloidal silicas, to use instead of peanut oil other vegetable oils such as olive oil, sesame oil, cottonseed oil, corn oil, etc., and to use instead of an ethylene oxide condensate over Rosaceae stone oil another similar product, or to add another aroma than orange oil. Finally, the enumeration and proportions of the vitamins given in the examples are in no way restrictive.

For example, it is possible to use vitamin $D_2$ instead of vitamin $D_3$, to incorporate or not to incorporate acetylated tocopherol or to incorporate acetylated or non-acetylated tocopherol, to use carotene instead of vitamin A, to incorporate, in addition to the water-soluble vitamins mentioned, vitamin $B_{12}$, vitamin $B_2$, $B_6$, PP, calcium pantothenate, tryptophane, lysine, a di- or polypeptide of cocarboxylase, without thereby exceeding the scope of the invention which, in addition to its advantages, is very simple to execute.

EXAMPLE 1

*Making a hydrodispersible multivitamin preparation*

54 g. of peanut oil are gelled by adding to a mortar 3 g. of colloidal silica "Aerosil," then heating the mixture for ten to fifteen minutes at a temperature ranging from 100 to 125° C. in an oil bath and to allow the mixture to cool to room temperature without stirring. The vitamins are first passed through a screen No. 120; 100 mg. vitamin $B_1$, 100 mg. of acetylated vitamin K (acetomenaphthone) and 5 g. of vitamin C are introduced into a mortar and triturated with oil gelled by silica.

On the other hand, 30 g. of "Labrafil" are scented with 3 g. of orange oil dissolving therein 1.50 g. of vitamin A acetate containing 1 million units per gram and 2.5 mg. of vitamin $D_3$; this solution is added to the gel comprising the water-soluble vitamins. Trituration is carried out until there is a homogeneous mass which is passed through the screen to separate the lumps or agglomerations that may exist in the preparation. This is brought up to exactly 100 cc. by the addition of gelled peanut oil. This produces a yellowish oily suspension perfectly water-dispersible.

The suspension upon titrating shows as follows per cc.:

| | |
|---|---|
| Vitamin $D_3$ | 25 μg. or 1000 I.U. |
| Vitamin A acetate | mg__ 15 |
| Vitamin $B_1$ | mg__ 1 |
| Vitamin K in the form of acetomenaphthone | mg__ 1 |
| Vitamin C | mg__ 50 |

Using 10 drops of such a dispersion in 20 to 25 cc. of water, a stable milky emulsion is produced which has an acid but not unpleasant flavor. Instead of using water, the preparation may, of course, be dispersed in milk, fruit juices or other drinks as long as these do not destroy the emulsion by acting on the dispersing agent. The product produced according to the invention may also be used in the veterinary art, being mixed, for example, with the drinking water of chickens.

*Example 2*

Following the method described in Example 1, the following suspension is prepared:

| | G. |
|---|---|
| Calcium ascorbate | 10.000 |
| Aerosil | 2.000 |
| Peanut oil—a quantity sufficient for 50.000 g. | |

On the other hand, 30 g. of Labrafil 1944 C are scented with 3 g. of mint oil dissolving therein:

| | G. |
|---|---|
| Vitamin A in the form of crystallized acetate | 2.500 |
| Vitamin $D_3$ in the form of crystallized free alcohol | 0.001 |
| Tocopherol | 0.100 |

This solution is mixed with the preceding suspension as described in Example 1. This is brought up to 100 cc. with peanut oil gelled with 2% colloidal silica.

*Example 3*

Following the method described in Example 1, a suspension is prepared as follows:

| | |
|---|---|
| Vitamin $B_{12}$ | mg__ 1 |
| Folic acid | mg__ 10 |
| Vitamin $B_1$ (hydrochloride) | g__ 0.100 |
| Vitamin PP | g__ 1.000 |
| Thiamine | g__ 0.800 |
| Lysine hydrochloride | g__ 0.600 |
| Racemic calcium pantothenate | g__ 0.100 |
| Dry liver extract—quantity corresponding to 1.200 kg. of liver. | |
| Aerosil | g__ 4.000 |
| Peanut oil—a quantity sufficient for 50.000 g. | |

On the other hand, 30 g. of Labrafil 1944 C are scented with 4 g. of mandarin or tangerine oil dissolving therein:

| | G. |
|---|---|
| Vitamin A in the form of acetate containing 1 million units per gram | 2.000 |
| Vitamin $D_2$ | 0.010 |

This solution is mixed with the preceding suspension as in Example 1 and filled up to 100 cc. with peanut oil gelled with 4% Aerosil.

*Example 4*

According to the method described in Example 1, the following suspension is prepared:

| | G. |
|---|---|
| Vitamin $B_1$ | 0.100 |
| Vitamin $B_2$ | 0.080 |
| Vitamin $B_6$ | 0.100 |
| Vitamin PP | 0.250 |
| Vitamin C | 2.500 |
| Racemic calcium pantothenate | 0.200 |
| Aerosil | 3.000 |
| Peanut oil—a quantity sufficient for 45.000. | |

On the other hand, 35 g. of Labrafil 1944 C are scented with 0.200 g. of anise oil, i.e., oil of aniseed, dissolving therein:

| | G. |
|---|---|
| Vitamin A in the form of acetate containing 1 million units per gram | 0.250 |
| Vitamin $D_3$ | 0.00125 |
| Vitamin E (tocopherol) | 0.100 |

This solution is mixed with the preceding suspension as in Example 1 and filled up to 100 cc. with peanut oil gelled with 3% Aerosil.

From the foregoing description taken in conjunction with the accompanying illustrative examples, it will be noted that there is provided by this invention a viable multivitamin preparation which is water dispersible and contains water and fat soluble vitamins for use in food, medicine, both human and animal, either per se or with medical ingredients.

While preferred examples have been described and given, it is to be noted that modifications as to ingredients, use of materials and quantities thereof may be made without departing from the spirit and scope of the invention as claimed.

I claim:

1. In a process of producing concentrated, stable, readily water-dispersible multivitamin preparations containing fat-soluble and water-soluble vitamins, said preparation forming, on dilution with water, an extremely fine dispersion of the fat-soluble vitamins and, in such diluted form, being readily assimilated by the body, the steps which comprise admixing colloidal silica to a pharmaceutically acceptable vegetable oil, heating said mixture to a temperature of at least 100° C., cooling said heated mixture of colloidal silica and vegetable oil to cause gelling thereof, incorporating water-soluble vitamins into said cooled gelled mixture of colloidal silica and vegetable oil, and admixing a solution of fat-soluble vitamins in a liquid produced by partial alcoholysis of Rosaceae kernel oil with polyethylene glycol to said gelled mixture of colloidal silica and vegetable oil having incorporated therein water-soluble vitamins.

2. The process according to claim 1, wherein the mixture of colloidal silica and vegetable oil is heated to a temperature between about 100° C. and about 125° C.

3. In a process of producing a concentrated, stable, readily water-dispersible multivitamin preparation containing fat-soluble and water-soluble vitamins, said preparation forming, on dilution with water, an extremely fine dispersion of the fat-soluble vitamins and, in such diluted form, being readily assimilated by the body, the steps which comprise admixing between about 2% and about 7% of colloidal silica to a pharmacologically acceptable vegetable oil, heating said mixture to a temperature of at least 100° C., cooling said heated mixture of colloidal silica and vegetable oil to cause gelling thereof, incorporating water-soluble vitamins into said cooled gelled mixture of colloidal silica and vegetable oil, and admixing a solution of fat-soluble vitamins in a liquid produced by partial alcoholysis of Rosaceae kernel oil with polyethylene glycol to said gelled mixture of colloidal silica and vegetable oil having incorporated therein water-soluble vitamins.

4. In a process of producing a concentrated, stable, readily water-dispersible multivitamin preparation containing fat-soluble and water-soluble vitamins, said preparation forming, on dilution with water, an extremely fine dispersion of the fat-soluble vitamins and, in such diluted form, being readily assimilated by the body, the steps which comprise admixing colloidal silica to a vegetable oil selected from the group consisting of peanut oil, olive oil, sesame oil, cotton seed oil, and corn oil, heating said mixture to a temperature of at least 100° C., cooling said heated mixture of colloidal silica and vegetable oil to cause gelling thereof, incorporating water-soluble vitamins into said cooled gelled mixture of colloidal silica and vegetable oil, and admixing a solution of fat-soluble vitamins in a liquid produced by partial alcoholysis of Rosaceae kernel oil with polyethylene glycol to said gelled mixture of colloidal silica and vegetable oil having incorporated therein water-soluble vitamins, said liquid being of light yellow color, its density at 20° C. being about 0.94, its viscosity at 20° C. being about 11.5 Engler, its refractive index $n_D^{20}$ being about 1,4705, its saponification value being between 160 and 165, its hydroxyl value being about 60, and its iodine value being about 88/89, said liquid becoming cloudy at a temperature of about −18° C. and becoming clear on increasing the temperature to about −6° C.

5. In a process of producing a concentrated, stable, readily water-dispersible multivitamin preparation containing fat-soluble and water-soluble vitamins, said preparation forming, on dilution with water, an extremely fine dispersion of the fat-soluble vitamins and, in such diluted form, being readily assimilated by the body, the steps which comprise admixing between about 2% and about 7% of colloidal silica to a pharmaceutically acceptable vegetable oil, heating said mixture to a temperature between about 100° C. and about 125° C., cooling said heated mixture of colloidal silica and vegetable oil to cause gelling thereof, incorporating water-soluble vitamins selected from the group consisting of the water-soluble vitamins of the B-group, vitamin C, vitamin K, vitamin PP, calcium ascorbate, calcium pantothenate, and acetylated vitamin K, into said cooled gelled mixture of colloidal silica and vegetable oil, and admixing a solution of fat-soluble vitamins selected from the group consisting of the vitamins of the D-group, vitamin A, vitamin E, vitamin F, and esters of said vitamins in a liquid produced by partial alcoholysis of Rosaceae kernel oil with polyethylene glycol to said gelled mixture of colloidal silica and vegetable oil having incorporated therein water soluble vitamins.

6. In a process of producing a concentrated, stable, readily water-dispersible multivitamin preparation containing fat-soluble and water-soluble vitamins, said preparation forming, on dilution with water, an extremely fine dispersion of the fat-soluble vitamins and, in such diluted form, being readily assimilated by the body, the steps which comprise admixing between about 2% and about 7% of colloidal silica to a vegetable oil selected from the group consisting of peanut oil, olive oil, sesame oil, cotton seed oil, and corn oil, heating said mixture to a temperature between about 100° C. and about 125° C., cooling said heated mixture of colloidal silica and vegetable oil to cause gelling thereof, incorporating water-soluble vitamins selected from the group consisting of the water-soluble vitamins of the B-group, vitamin C, vitamin K, vitamin PP, calcium ascorbate, calcium pantothenate, and acetylated vitamin K, into said cooled gelled mixture of colloidal silica and vegetable oil, and admixing a solution of fat-soluble vitamins selected from the group consisting of the vitamins of the D-group, vitamin A, vitamin E, vitamin F, and esters of said vitamins, in a liquid produced by partial alcoholysis of Rosaceae kernel oil with polyethylene glycol to said gelled mixture of colloidal silica and vegetable oil having incorporated therein water-soluble vitamins, said liquid being of light yellow color, its density at 20° C. being about 0.94, its viscosity at 20° C. being about 1,4705, its saponification value being between 160 and 165, its hydroxyl value being about 60, and its iodine value being about 88/89, said liquid becoming cloudy at a temperature of about −18° C. and becoming clear on increasing the temperature to about −6° C.

7. In a process of producing a concentrated, stable, readily water-dispersible multivitamin preparation containing fat-soluble and water-soluble vitamins, said preparation forming, on dilution with water, an extremely fine dispersion of the fat-soluble vitamins and, in such diluted form, being readily assimilated by the body, the steps which comprise admixing between about 2% and about 7% of colloidal silica to a pharmaceutically acceptable vegetable oil, heating said mixture to a temperature between about 100° C. and about 125° C., cooling said heated mixture of colloidal silica and vegetable oil to cause gelling thereof, incorporating water-soluble vitamins selected from the group consisting of the water-soluble vitamins of the B-group, vitamin C, vitamin K, vitamin PP, calcium ascorbate, calcium pantothenate, and acetylated vitamin K, and water-soluble lipid-insoluble food supplements and drugs selected from the group consisting of dry liver extract, essential amino acids, ferments, peptides, and inorganic and organic metal compounds, into said cooled gelled mixture of colloidal silica and vegetable oil, and admixing a solution of fat-soluble vitamins selected from the group consisting of the vitamins of the D-group, vitamin A, vitamin E, vitamin F, and esters of said vitamins, and lipid-soluble aromatic substances selected from the group consisting of oil of orange, oil of tangerine, oil of peppermint, and oil of anise, in a liquid produced by partial alcoholysis of Rosaceae kernel oil with polyethylene glycol to said gelled mixture of colloidal silica and vegetable oil having incorporated therein water-soluble vitamins, food supplements, and drugs.

8. A concentrated, stable, readily water-dispersible multivitamin preparation containing fat-soluble and water-soluble vitamins, said preparation comprising an intimate mixture of a gel composed of a pharmaceutically acceptable vegetable oil gelled by the addition of colloidal silica, said gel having been heated and then cooled, said gel containing incorporated therein water-soluble vitamins, with a solution of fat-soluble vitamins in a liquid produced by partial alcoholysis of Rosaceae kernel oil with polyethylene glycol, said preparation forming, on dilution with water, an extremely fine dispersion of the fat-soluble vitamins and, in such diluted form, being readily assimilated by the body.

9. A concentrated, stable, readily water dispersible multivitamin preparation containing fat-soluble and water-soluble vitamins, said preparation comprising an intimate mixture of a gel composed of a pharmaceutically acceptable vegetable oil gelled by the addition of colloidal silica, said gel having been heated and then cooled, said gel containing incorporated therein water-soluble vitamins, with a solution of fat-soluble vitamins in a liquid produced by partial alcoholysis of Rosaceae kernel oil with polyethylene glycol, said preparation forming, on dilution with water, an extremely fine dispersion of the fat-soluble vitamins and, in such diluted form, being readily assimilated by the body, said preparation containing, per 100 cc.,

| | | |
|---|---|---|
| Vitamin $B_1$ | mg | 100 |
| Vitamin K acetate | mg | 100 |
| Vitamin C | g | 5 |
| Vitamin A as acetate (1 million units per g.) | g | 1.5 |
| Vitamin $D_3$ | mg | 2.5 |
| Colloidal silica | g | 3 |
| Liquid produced by partial alcoholysis of Rosaceae kernel oil with polyethylene glycol | g | 30 |

10. A concentrated, stable, readily water dispersible multivitamin preparation containing fat-soluble and water-soluble vitamins, said preparation comprising an intimate mixture of a gel composed of a pharmaceutically acceptable vegetable oil gelled by the addition of colloidal silica, said gel having been heated and then cooled, said gel containing incorporated therein water-soluble vitamins, with a solution of fat-soluble vitamins in a liquid produced by partial alcoholysis of Rosaceae kernel oil with polyethylene glycol, said preparation forming, on dilution with water, an extremely fine dispersion of the fat-soluble vitamins and, in such diluted form, being readily assimilated by the body, said preparation containing, per 100 cc.,

| | | |
|---|---|---|
| Vitamin A as crystalline acetate | g | 2.5 |
| Vitamin $D_3$ as crystalline free alcohol | mg | 1 |
| Vitamin E | g | 0.1 |
| Calcium ascorbate | g | 10 |
| Colloidal silica | g | 2 |
| Liquid produced by partial alcoholysis of Rosaceae kernel oil with polyethylene glycol | g | 30 |
| Oil of peppermint | g | 3 | the remainder being peanut oil.

11. A concentrated, stable, readily water dispersible multivitamin preparation containing fat-soluble and water-soluble vitamins, said preparation comprising an intimate mixture of gel composed of a pharmaceutically acceptable vegetable oil gelled by the addition of colloidal silica, said gel having been heated and then cooled, said gel containing incorporated therein water-soluble vitamins, with a solution of fat-soluble vitamins in a liquid produced by partial alcoholysis of Rosaceae kernel oil with polyethylene glycol, said preparation forming, on dilution with water, an extremely fine dispersion, of the fat-soluble vitamins and, in such diluted form, being readily assimilated by the body, said preparation containing, per 100 cc.,

| | | |
|---|---|---|
| Vitamin A as acetate (1 million units per g.) | g | 2 |
| Vitamin $D_2$ | mg | 10 |
| Vitamin $B_{12}$ | mg | 1 |
| Folic acid | mg | 10 |
| Vitamin $B_1$ hydrochloride | mg | 100 |
| Vitamin PP | g | 1 |
| Vitamin $B_1$ | mg | 800 |
| Lysine hydrochloride | mg | 600 |
| Racemic calcium pantothenate | mg | 100 |
| Dry liver extract in an amount corresponding to 1,200 kg. of liver. | | |
| Colloidal silica | g | 4 |
| Liquid produced by partial alcoholysis of Rosaceae kernel oil with polyethylene glycol | g | 30 |
| Oil of tangerine | g | 4 | the remainder being peanut oil.

12. A concentrated, stable, readily water dispersible multivitamin preparation containing fat-soluble and water-soluble vitamins, said preparation comprising an intimate mixture of a gel composed of pharmaceutically acceptable vegetable oil gelled by the addition of colloidal silica, said gel having been heated and then cooled, said gel containing incorporated therein water-soluble vitamins, with a solution of fat-soluble vitamins in a liquid produced by partial alcoholysis of Rosaceae kernel oil with polyethylene glycol, said preparation forming, on dilution with water, an extremely fine dispersion of the fat-soluble vitamins and, in such diluted form, being readily assimilated by the body, said preparation containing, per 100 cc.,

| | | |
|---|---|---|
| Vitamin $D_3$ | mg | 1.25 |
| Vitamin A as acetate (1 million units per g.) | mg | 250 |
| Vitamin E | mg | 100 |
| Vitamin $B_1$ | mg | 100 |
| Vitamin $B_2$ | mg | 80 |
| Vitamin $B_6$ | mg | 100 |
| Vitamin PP | mg | 250 |
| Vitamin C | g | 2.5 |
| Racemic calcium pantothenate | mg | 200 |
| Colloidal silica | g | 3 |
| Liquid produced by partial alcoholysis of Rosaceae kernel oil with polyethylene glycol | g | 35 |
| Oil of anise | mg | 200 | the remainder being peanut oil.

13. In a process of producing a concentrated, stable, readily water-dispersible multivitamin preparation containing fat-soluble and water-soluble vitamins, said preparation forming, on dilution with water, an extremely fine dispersion of the fat-soluble vitamins and, in such diluted form, being readily assimilated by the body, the steps which comprise admixing colloidal silica to a pharmaceutically acceptable vegetable oil, heating said mixture to a temperature of at least 100° C., cooling said heated mixture of colloidal silica and vegetable oil to cause gelling thereof, incorporating water-insoluble vitamins into said cooled gelled mixture of colloidal silica and vegetable oil, and admixing a mixture of water-soluble vitamins in a liquid produced by partial alcoholysis of Rosaceae kernel oil with polyethylene glycol to said gelled mixture of colloidal silica and vegetable oil having incorporated therein water-insoluble vitamins.

References Cited in the file of this patent
UNITED STATES PATENTS

| 1,970,578 | Schoeller | Aug. 21, 1934 |
|---|---|---|
| 2,086,479 | Schrauth | July 6, 1937 |
| 2,658,869 | Stross | Nov. 10, 1953 |
| 2,681,314 | Skinner | June 15, 1954 |